United States Patent
Zimmermann et al.

(10) Patent No.: US 7,577,110 B2
(45) Date of Patent: Aug. 18, 2009

(54) AUDIO CHAT SYSTEM BASED ON PEER-TO-PEER ARCHITECTURE

(75) Inventors: Roger Zimmermann, Walnut, CA (US);
Leslie S. Liu, Alhambra, CA (US);
Beomjoo Seo, Culver City, CA (US);
Kemal Oral Cansizlar, Seattle, WA (US)

(73) Assignee: University of Southern California, Los Angeles, CA (US)

( * ) Notice: Subject to any disclaimer, the term of this patent is extended or adjusted under 35 U.S.C. 154(b) by 110 days.

(21) Appl. No.: 11/504,536

(22) Filed: Aug. 11, 2006

(65) Prior Publication Data
US 2007/0036175 A1 Feb. 15, 2007

Related U.S. Application Data

(60) Provisional application No. 60/707,816, filed on Aug. 12, 2005.

(51) Int. Cl.
*H04Q 11/00* (2006.01)
(52) U.S. Cl. ............... 370/260; 370/254; 370/352; 370/261
(58) Field of Classification Search ........... 370/260, 370/261, 352, 390
See application file for complete search history.

(56) References Cited

U.S. PATENT DOCUMENTS 7,266,091 B2 * 9/2007 Singh et al. ............... 370/260

| 2002/0126626 | A1 | 9/2002 | Singh et al. | |
|---|---|---|---|---|
| 2004/0008635 | A1 * | 1/2004 | Nelson et al. | 370/260 |
| 2006/0187860 | A1 * | 8/2006 | Li | 370/260 |
| 2006/0221869 | A1 * | 10/2006 | Chua | 370/260 |
| 2006/0245378 | A1 * | 11/2006 | Jeong et al. | 370/261 |

OTHER PUBLICATIONS

Banerjee, S., et al., "Scalable application layer multicase," *ACM SIGCOMM Computer Communication Review*, 32(4):205-217, Oct. 2002.

Castro, M., et al., "Scribe: A Large Scale and Decentralized Application-Level Multicast Infrastructure," *IEEE Journal on Selected Areas in Communications (JSAC)*, 20(8):1489-1499, Oct. 2002.

Chu, Y., et al., "Enabling conferencing applications on the internet using an overlay multicast architecture," *ACM SIGCOMM Computer Communication Review*, 31(4):55-67, Oct. 2001.

Gallager, R., et al., "A Distributed Algorithm for Minimum-Weight Spanning Trees," *ACM Transactions on Programming Languages and Systems*, 5(1):66-77, Jan. 1983.

(Continued)

*Primary Examiner*—Simon Sing
*Assistant Examiner*—Simon King
(74) *Attorney, Agent, or Firm*—Fish & Richardson P.C.

(57) ABSTRACT

A peer to peer audio communication screen in system with adaptive bandwidth control. The peer-to-peer system can be used, for example, in classroom applications. More interactive peers are moved to a position where they will receive lower latency from the peer-to-peer system. This may be done by maintaining a score indicative of the amount of interactivity, and then using that score to move a peer either close to the source of audio packets, e.g., the core or further from that source.

15 Claims, 4 Drawing Sheets

OTHER PUBLICATIONS

Koguchi, K., et al., "QoS Measurement of VoIP End-Points," *IEICE Group Meeting on Network Systems*, 102(512):29-32, Dec. 2002.

MacMillan, K., et al., "Audio Latency Measurements of Desktop Operating Systems," *International Computer Music Conference Proceedings (ICMC '01)*, 4 pages, Sep. 2001.

Ratnasamy, S., et al., "Application-Level Multicast Using Content-Addressable Networks", *In Proceedings of 3rd International Workshop on Networked Group Communication*, vol. 2233, pp. 14-29, Nov. 2001.

Singh, K., et al., "Centralized conferencing using SIP," *Internet Telephony Workshop*, 7 pages, Apr. 2001.

Vin, H., et al., "Hierarchical Conferencing Architectures for Inter-Group Multimedia Collaboration," *Proceedings of the Conference on Organizational Computing Systems*, pp. 43-54, (1991).

Zhang, B., et al., "Host Multicast: A Framework for Delivering Multicast to End Users," *Proceedings of IEEE INFOCOM*, vol. 3, pp. 1366-1375, Jun. 2002.

Zimmermann, R., et al., "Active : Adaptive Low-Latency Peer-to-Peer Streaming," *SPIE Proceedings of Multimedia Computing and Networking*, San Jose, CA , vol. 5680, pp. 26-37, Jan. 2005.

International Search Report dated Sep. 29, 2008 for International Application No. PCT/US2006/031745, filed Aug. 14, 2006 (8 pages).

\* cited by examiner

AUDIO CHAT SYSTEM BASED ON PEER-TO-PEER ARCHITECTURE

CROSS-REFERENCE TO RELATED APPLICATIONS

This application claims priority to U.S. Application Ser. No. 60/707,816, filed on Aug. 12, 2005. The disclosure of the prior application is considered part of (and is incorporated by reference in) the disclosure of this application.

FEDERALLY SPONSORED RESEARCH OR DEVELOPMENT

The U.S. Government may have certain rights in this invention pursuant to Grant No. EEC-9529152 awarded by NSF.

BACKGROUND

The Internet has made possible the provision of data streams over a publicly available network. This allows anyone who can connect to the network to the information that the network carries.

Applications of the Internet have been used in remote education. The Internet can be used as a substitute for lecture halls, to allow any person at any place to virtually attend a lecture. The attendance includes the reception of audio, video and any other kind of learning aids on their terminal.

Studies have shown that simple one-way communication e.g. a lecture broadcast is less of a learning experience than attending an on-campus class.

SUMMARY

The present application describes collaboration tools for use in a system for learning that is available over the Internet. Different aspects are described, including an audio chat room system for use with an educational system to allow interaction, including, for example, discussion among students, student questions, and feedback.

One aspect includes a way of optimizing the chat room so that certain users are specified as being active, with other users specified as being passive. The active users receive better access to the system resources.

DETAILED DESCRIPTION

The general structure and techniques, and more specific embodiments which can be used to effect different ways of carrying out the more general goals, are described herein.

An embodiment describes a multiuser peer based, dynamic audio chat system usable over the Internet for various applications. An embodiment describes use of the chat system for educational purposes. The system has technique for accommodating a large number of participants, with each student being able to hear and talk to any other person in the session. The technique manage the audio latency to enable natural interaction among the students.

An embodiment describes a multicast protocol which uses a peer-to-peer architecture for the chat room system. Advantages include scalability of the chat room system over a large user base while requiring minimal resources from the central server system.

A first embodiment, simply connects each participant to a central server that merges the incoming audio streams and distributes the final mixed result to every connected listener. This may be a star shaped layout that allows the sessions to be centrally managed from the central server. The lags in sound streams are based on distance of users from the server and server loads.

A disadvantage of the system, however, is that it requires a relatively large amount of resources at the central server. For example, the number of resources may be proportional to the number of participants. The server also forms a single point of failure, which may bottleneck the system.

Figure 1:
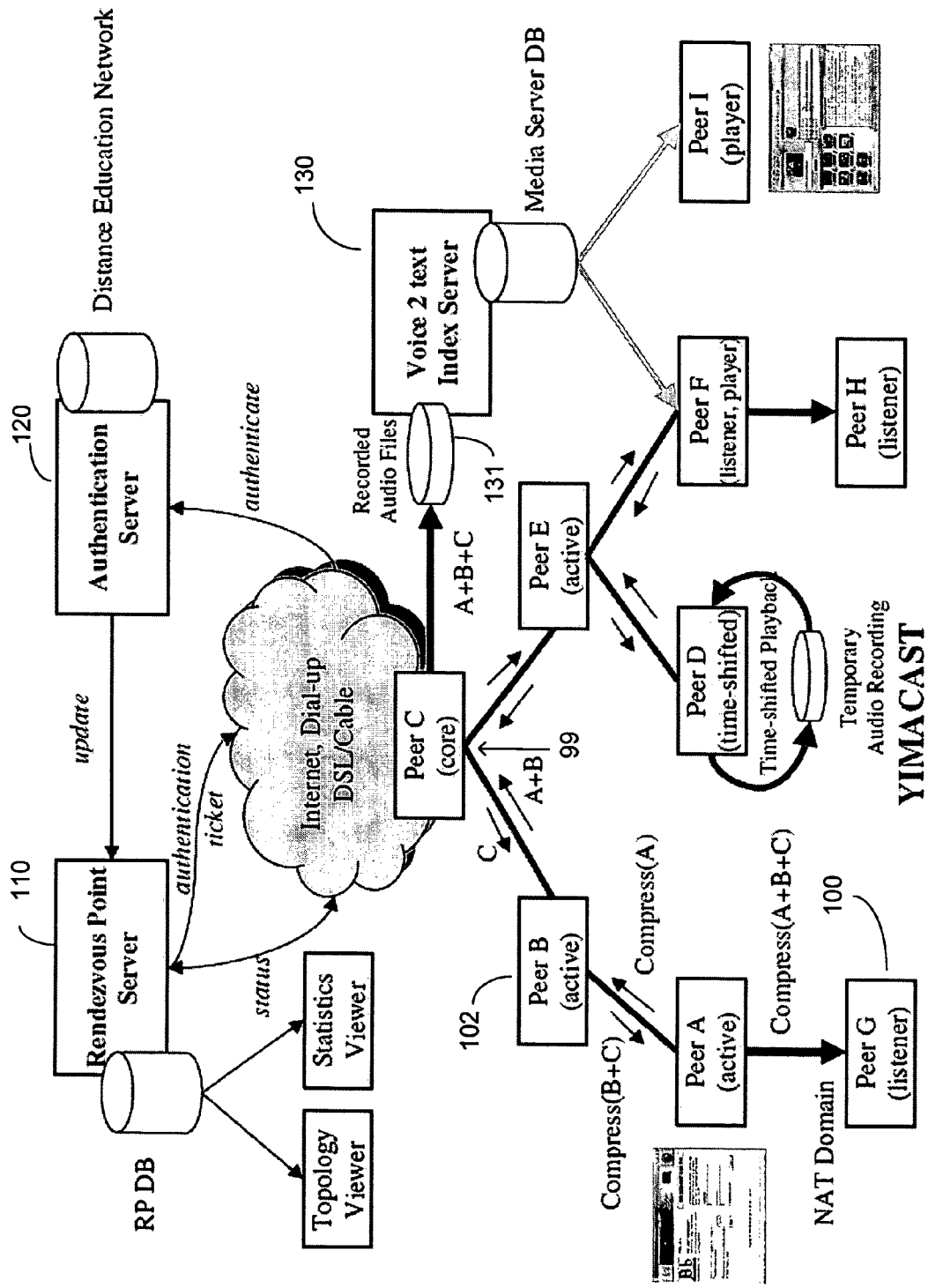
FIG. 1 shows the overall distributed peer to peer architecture of the audio system.

Another embodiment, therefore, uses a distributed peer architecture, and is shown in FIG. 1. In this distributed peer architecture, each newly joining user connects to one or more peers who is already participating in an ongoing audio chat system. This minimizes bandwidth. For example, in the embodiment of FIG. 1, information may be sent from peer c to peer b to peer a, and on to peer g. Therefore, many peers may receive information and send that information on to other peers. As such, the total bandwidth consumed may be optimized and/or managed.

An embodiment handles the audio latency from such a system as described herein. The inventors' research shows that interactive conversations should not have a delay of more than 150 to 250 ms. Latencies beyond this amount may appear unnatural. An embodiment dynamically adjusts peer connectivity to optimize the audio transmission and maintain this latency. In the embodiment, audio mixing may be performed at each member node in order to reduce the network bandwidth. This allows supporting many simultaneous audio chat sessions.

Two different management structures are maintained. The casting software manages the multi-cast tree within a session. Multisession management is provided, in contrast, at the system level. Four different components are used to communicate and monitor and control the software management. These include multiple audio peers, which correspond to the peers in the system. The peers are shown in FIG. 1, for example as Peer a (node 100), peer b (node 102) and others. The peer connections are managed by a rendezvous point server 110 which is used along with an authentication server 120. A voice to text indexing service 130 is also used to allow converting voice information to text on the fly as well as storing information for time shifting playback.

The different parts of the software communicate to support the different functions. The software may include an embedded Web browser, an application level multicast connection manager, and an audio manager running within the respective servers. The Web browser allows users to contact the authentication server 120, to log in to the system, and become part of a peer communication.

The Web browser may also include an interface to query and retrieve pre-recorded audio files. As described herein, certain peers may operate in a time shifted mode, listening to temporary audio recordings, or may listen to recordings totally off-line.

A connection manager is formed by the rendezvous server 110 and the authentication server 120. These handle the application level connections with other remote audio peers. This uses a shared multi-cast protocol as described herein. An audio manager captures audio samples and plays them continuously. The audio manager may also mix incoming packets sent from other audio peers that are connected along the delivery path.

Each of the audio peers may take on one of a number of different functional roles.

An active peer participates in online discussions, and is actively participating. The active peer will require low end-to-end latency with other active peers.

A time shifted peer may listen to the current discussion temporally separated from real time. While listening to the discussion, the time shifted peer automatically records the incoming packets into a file. The file can be reproduced when the user requests a resume operation. The time shifted peer may take certain operations to attempt to catch up with real-time, such as skipping audio packets which represent silence, or fast forwarding.

A listener peer is a passive user who mostly listens to the current discussions, and speaks either not at all or infrequently. The listener peer requires less type delay bounds, and enables higher audio quality. A special case of a listener is a record or peer that receives audio packets and stores them in an audio file. A player may then render pre-recorded audio content that is stored on the voice to text indexing server 130.

One feature of this system distinguishes active users from passive users. This allows intelligent optimization on the subgroup rather than the whole group. The peer-to-peer structure may be dynamically adapted in order to maintain quality of service for the active users. It is preferable that the active peers be located closer to the core node 99. Listeners, and other peers which require less tight synchronization constraints may be located towards the outside of the network, the "leaves of the tree".

The local area where the live presentation is being presented may be, for example, at a university. The remote portions form a distance education network.

In order for a student or other to obtain access to the distance education network, the student must interact with authentication server 120. This may be, for example, a Web based server that maintains class information, registered user information, and maintains recorded lecture materials or links to the recorded lecture materials. The user is verified by the authentication server. After the user has been verified, the login information is forwarded to the rendezvous point server 110. The rendezvous point server 110 enables an authenticated node to join an ongoing session. It stores information about users, currently available sessions, and other peers. The rendezvous point server 110 may also maintain a statistics server and a topology visualizer for administrative purposes.

When an audio peer is authenticated, the peer can freely join and leave sessions at any time without contacting the rendezvous point server. This decentralizes the tree migration.

The indexing service 130 maintains certain indexes of the information which is available on the server. For example, this may allow users to perform a keyword search and retrieve matching audio fragments through a Web interface. The indexing service 130 may include an audio recorder, which converts sound into some perceivable form, as well as an indexing server. The recorder is connected to one of the peers, here the core peer 99. However, the recorder 131 may be alternatively connected to any other peer. Any live session is monitored by the server 130 which stores the audio packets into a file, and extracts key words and associated audio fragments from those files. For example, this may be done by using a speaker independent voice to text recognition system.

The index server may use other audio processing plug-ins. Speaker identification may attempt to identify the speaker who is speaking. Since that speaker has registered via the authentication server, this may be a simple matter of comparing the voice to a limited subset of voices. The system may also use audio classification. The audio classification may recognize specific audio types such as thunder, applause, laughter, and silence. Timestamp information for classification based queries may be provided. This may also enable a listener to remove or skip over those classification based queries.

The system uses an application level multicast protocol designed to serve as a reliable audio streaming program and to provide minimum overall and command lag among peer nodes. A shared multicast tree is maintained, with some of the leaves of that tree receiving more priority to make sure that those higher priority leaves receive less audio delay.

Figure 2:
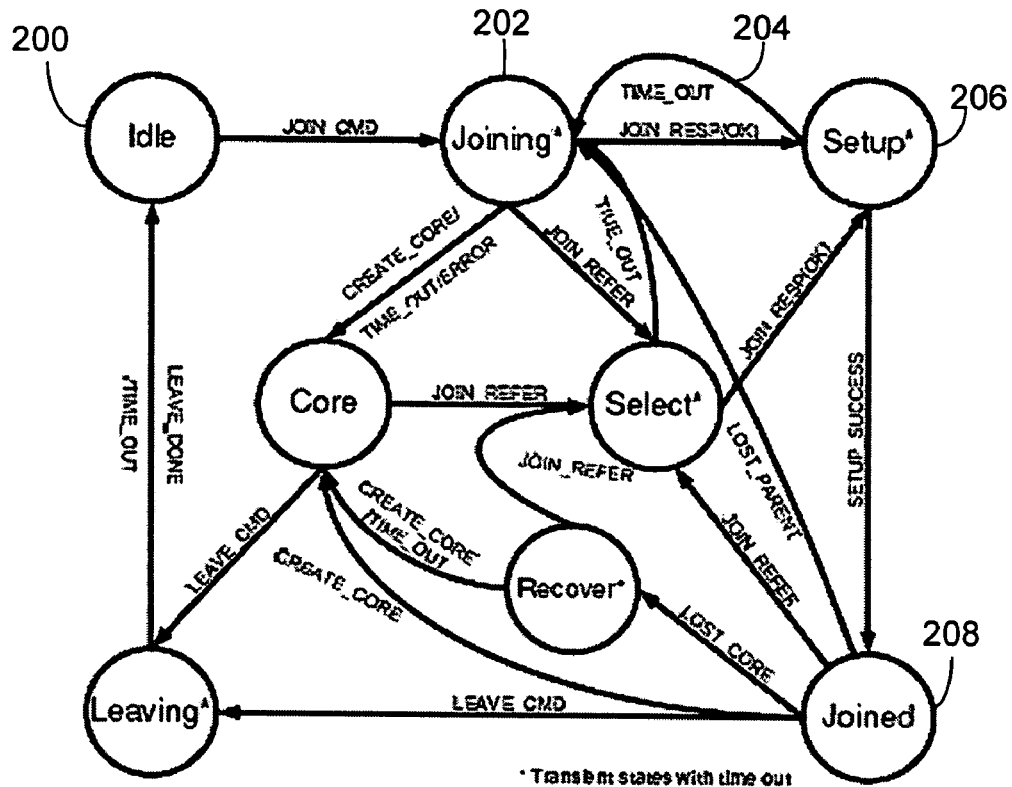
FIG. 2 shows a tree construction as a Peer state diagram.

FIG. 2 illustrates the tree construction. The idle state at 200 is the normal state from which the operations are initiated. In order to join the multicast at 202, a connection to the server is initiated, shown as tree 204, which requests a join, and either times out, or receives an OK. The connection is initiated when the authentication server does its authenticating, and then by the rendezvous point server which replies with information for the client to set up an audio connection with existing peer nodes.

The set up at 206 leads to a "joined" indication at 208, which returns the information to set up the audio connection. This so-called "bootstrap" phase is the only time when a protocol needs to contact a central server. After the bootstrap phase, all tree maintenance may be performed in a distributed matter.

The minimum end-to-end delay requires a solution to the so-called Steiner tree problem. This problem is known to be NP complete. All the nodes in the tree are multicast members, reducing the problem to the minimum spanning tree problem, which can be solved in polynomial times. Different techniques are known to solve for minimum spanning tree problems. However, each of these techniques require rebuilding the complete tree each time a node joins or leaves, making them difficult for the current application.

In this embodiment, a heuristic shortest path tree algorithm is used during the join process, to attach the new node to the nearest known node in the multicast tree. This allows achieving a minimum tree delay cost while concurrently minimizing service interruptions to the existing nodes. Another aspect describes handling the dynamics of this distributed environment. Various errors can occur at runtime. For example, errors may include the failure to establish a connection with the parent node, loss of the connection during operation, loss of the core node, and the like. Accordingly, this system incorporates a multilayered error handling policy. The distributed error handling policy can correct most errors without asking for help from the central server.

The distributed system also addresses end to end delay and playback pickups. The end to end delay is based on the latency between speakers and listeners. The goal is usually to minimize the delay. Playback hiccups, in contrast, are caused by the variable delivery time of playback packets over a standard TCP/IP network. Data buffering can be used at the playback side to help smooth out the jitters, but playback offering itself may increase the end to end delay. Hence, the two problems have conflicting goals. Accordingly, the system uses a dynamic tree optimization algorithm that depends on the user's individual quality of service to millions for the audio chat room.

This, in turn, may depend on whether a user is in a specified mode. For example, a user may be in either a listening mode or a speaking mode. Users who speak more frequently require shorter end to end latency, because too much delay between speakers may render the conversation uncomfortable. At the same time, users who are mostly listening may tolerate a longer delay. The focus in this latter case should be minimizing the playback hiccups to obtain a better listening experience, at the cost of longer end to end delay.

The dynamic reduction in end to end delay among speakers is achieved by clustering speaker nodes. This is carried out by continually monitoring the behavior of the user. If the user speaks frequently, the user gets migrated closer towards the core. On the other hand, when a user is silent for extended times during a chat session, the client increases the audio playback buffer to reduce audio delays and hiccups, and, for example, may move that node further from the core.

Hence, this technique adaptively moves active peers closer to the core, while moving passive peers towards the leaves of the tree. The quality of service requirements of both groups are hence optimally handled. Moreover, the core node is not as important as the clustering. The core node is the generic reference direction towards which the active peers move. Once clustered, delay between the speakers is optimized. Therefore, the optimization result becomes more or less independent of the speaker's position.

One way in which the users can be managed is described herein, called the credit point system. In this embodiment, when the node joins a specified tree, the node is assigned with a credit point value CP. The initial value may be assigned as:

$CP_{root}=1$ $CP_{child}=CP_{child}/K, K>=2$

Where K is the degree limit of the tree. Each node keeps its credit point value $CP_i$ for node I until the topology of the tree is changed.

A threshold for switch transitions is set as:

$CP_i>=CP_t,$ where I is within the set of nodes V, and where $CP_t$ is the systemwide threshold for switch transitions. When equation 4 is satisfied, the node switches from passive to active mode. hence, this equation governs when a node becomes active. A maximum number of active nodes can also be set, with those nodes that have the minimum CP value being dropped from the list of active nodes.

the tree may also be formed and optimize using an active process. For example, a new node may look for candidate nodes for connection. This may use the following pseudocode:

| Algorithm 1 JOIN |
|---|
| Require: RP is online |
| 1:   L ← candidate nodes from RP |
| 2:   while L ≠ 0 do |
| 3:       C ← nearest node in L |
| 4:       if C is ok to join then |
| 5:           setup connection with C |
| 6:           parent ← C |
| 7:           break while loop |
| 8:       else |
| 9:           L ← add new candidate nodes referred by C |
| 10:          remove C from L |
| 11:      end if |
| 12:  end while |

A leading node need to do far fewer steps, mostly just steps to maintain the integrity of the tree, for example make sure that the tree is loop free.

| Algorithm 2 LEAVE |
|---|
| 1:   inform all neighbor nodes that N is leaving |
| 2:   if N is the core then |
| 3:       C∫ ← nearest neighbor node |
| 4:       setup C∫ as the new core |
| 5:       inform all other neighbor nodes to set C∫ as parent |
| 6:   else |
| 7:       if N has child node then |
| 8:           N∫ ← N's parent |
| 9:           inform all child nodes to set N∫ as parent |
| 10:      end if |
| 11:  end if |
| 12:  disconnect from the service |

An optimization technique may also be used. Optimization may be carried out at intervals, for example, or may or alternatively be carried out any time the delay to a desired user becomes longer than necessary. The optimization may move some or each active nodes toward the root, continuing until the parent is also an active node. This may continue by clustering the active users further.

| Algorithm 4 OPTIMIZE |
|---|
| 1:   AGAIN: |
| 2:   P ← parent of local host i |
| 3:   $I_P$ ← idle time at P |
| 4:   if $I_P \leq R^{-1}$ then |
| 5:       return |
| 6:   end if |
| 7:   //First Phase |
| 8:   while P is not active do |
| 9:       if P is core then |
| 10:          ask P to set local host i as parent |
| 11:          setup local host i as core |
| 12:      else |
| 13:          P∫ ← the parent of P |
| 14:          ask P to set local host i as its parent |
| 15:          ask P∫ to set local host as new child |
| 16:          P ← P∫ |
| 17:          setup connection with P∫ |
| 18:      end if |
| 19:  end while |
| 20: |
| 21:  //Second Phase |
| 22:  if $CP_i \geq CPt$ then |
| 23:      send update message to all children nodes |
| 24:      return |
| 25:  else |
| 26:      L∫ ← all passive node immediate connected to A |
| 27:      remove all host j from L∫ if $CP_j \leq CP_i$ or $CP_j = 1$ |
| 28:      if L∫ = 0 then |
| 29:          send update message to all children nodes |
| 30:          return |
| 31:      else |
| 32:          C ← first node in L∫ |
| 33:          P∫ ← the parent of C |
| 34:          ask C to set P as its parent |
| 35:          ask P∫ to set local host as new child |
| 36:          P ← P∫ |
| 37:          setup connection with P∫ |
| 38:      end if |
| 39:  end if |
| 40:  goto AGAIN: |

A dynamic floor control function may also be used. This may limit the number of active users who are allowed to speak at any given time.

Another aspect relates to a software-based audio mixing technique. The audio mixing technique focuses on minimizing the network utilization for the audio conferencing application. The original audio bandwidth is maintained wherever possible, by aggregating uncompressed audio sources.

TABLE 1

Audio types supported.
Supported audio media types

| | Compression Type | | | |
|---|---|---|---|---|
| | uncompressed | | compressed | |
| Audio Format | PCM | PCM | GSM.610 | MPEG Layer3 |
| Bits per Sample | 8 | 16 | 8 | 16 |
| Channels | mono | stereo | mono | stereo |
| Sampling Rate | 8 KHz/16 KHz | 48 KHz | 8 KHz | 48 KHz |
| Delivery Rate | 64 Kbps/128 Kbps | 1.536 Mbps | 13 Kbps | 56 Kbps |
| Usage Method | LAN | LAN | dial-up modem | cable modem, DSL |
| Latency Requirement | low | low | low | high |
| Audio Quality | medium | high | low | high |

Table 1 shows some exemplary audio media types and their characteristics. The different characteristics may be roughly clustered into high quality low latency, medium quality low latency, low quality low latency, and high quality high latency. GSM.610 is an audio codec that has a small compression delay and tolerable audio delay. This latter high quality high latency audio format may be useful because some audio peers, for example those participating as listeners or recorders, may be connected via a low bandwidth network.

Each peer node may include an audio mixing module that relays incoming audio from remote nodes to the outgoing connections. Each conference can have its audio set to hence create a specific quality audio sample. For example, a conference participant may use PCM stereo sound, or may use GSM quality.

The software-based mixing technique is called decode-mix-encode. A linear mixing technique requires that all the input audio bit streams are uncompressed for simple arithmetic additions and subtractions. Thus, all the incoming encoded bit streams are decoded into their uncompressed form. The resulting uncompressed bit streams are merged to a mixed bit string. That stream is later used when constructing the outgoing streams for the respective remote nodes.

Figure 3A:
FIGS. 3a and 3b show software-based audio mixing.
Figure 3B:
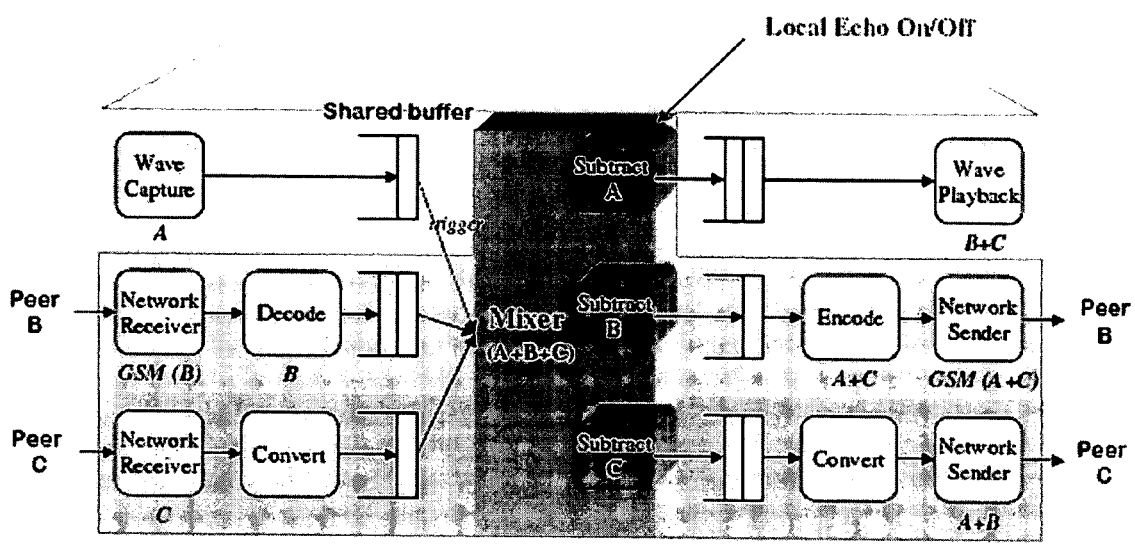
Figure 4:
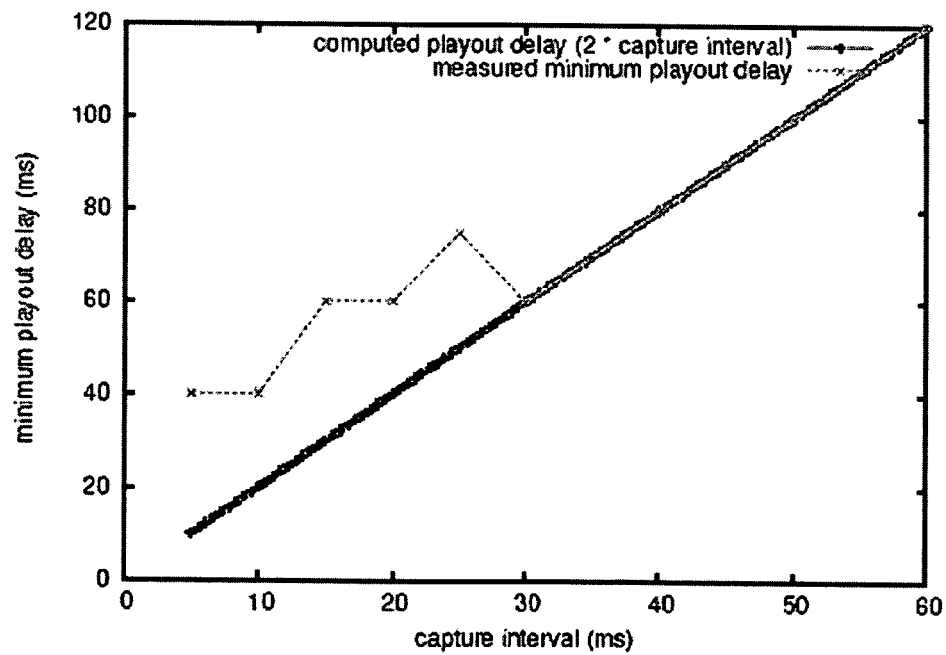
FIG. 4 is a graph showing the minimum play-out delay per capture interval.
Figure 5:
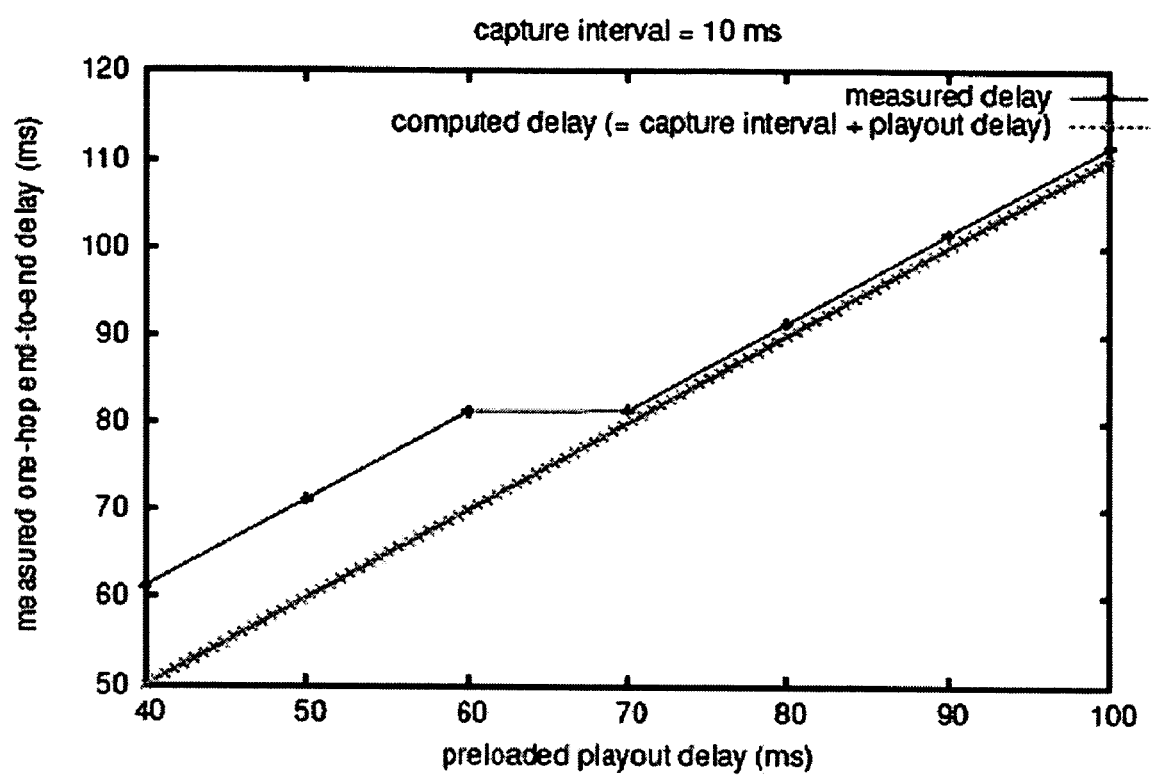
FIG. 5 is a graph showing measured one-hop end-to-end delay in a LAN environment.

FIG. 3 illustrates an example that has three peer nodes a, b and c. FIG. 3a illustrates the connection of the nodes, while FIG. 3b illustrates the connections of the mixer. Peer a locally captures uncompressed audio samples with a bandwidth of 1.5 Mb per second. Two uni directional links between A&B are constructed to transfer compressed audio packets. For example, the compressed audio packets may be at 13 kb per second GSM streams as shown. The links between A and C are uncompressed PCM audio transmissions at 64 kb per second. Peer a receives the audio packets beta and gamma respectively from peers B and C. It also generates newly captured audio packets alpha periodically. This information means that the audio mixer performs the following operations:

The audio mixer trans-codes incoming audio packets into linearly uncompressed audio packets. Uncompressed audio is stored in memory, since it is easier to arithmetically manipulate these uncompressed audio elements.

Subsequently, the uncompressed packets are added, for example phi=alpha+beta+gamma.

After this, the original audio is subtracted from the mixed stream. For example for local playback, the original audio packets alpha are subtracted from phi, resulting in (beta plus gamma). for the packets for peer b, beta is subtracted from phi, resulting in alpha plus gamma. Analogously, for peer c, gamma is subtracted from phi, resulting in alpha plus beta.

The subtracted audio bit streams are encoded as network supported audio format. The local playback module does not require encoding, but the outgoing audio bitstream requires encoding according to the channel which is used. For example, the outgoing audio bitstream alpha plus gamma, for node b, requires encoding from a 1.5 Mb per second PCM bitstream to a 13 kb per second GSM bitstream. For c, alpha plus beta needs to be transcoded from a 1.5 Mb per second PCM bitstream to a 64 kb per second PCM bitstream.

After the encoding, the audio bit streams are packetized and sent to the remote peer nodes respectively.

The simple addition preserves the volume level throughout a session, however it may cause integer overflows when multiple spurts of talking are added simultaneously.

Another approach involves dividing the original talkspurts by the number of participants, or by the number of active participants prior to adding it to the mixed stream.

An embodiment may use an augmented version of the simple addition, by detecting overruns prior to the addition, and lowering the volume level of the audio sources. The mixer may preferably be implemented as a single thread with real-time priority. It is blocked until the local capture module uses a wake-up signal or interrupt. Upon awakening, the mixer collects uncompressed audio samples, aggregates them, and then subtracts the original data. This guarantees a continuous pickup for your audio transmission to the remote nodes. The queuing delays may slightly increase the end to end delay.

Another aspect may detect silence, and use the silence to establish the noise floor. The noise floor can improve the audio mixing.

Another aspect may migrate the nodes based on their active speakers status.

The general structure and techniques, and more specific embodiments which can be used to effect different ways of carrying out the more-general goals are described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, different kinds of networks can be used.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method, comprising:
   establishing a peer to peer connection between a plurality of peers including a core peer and a plurality of node peers, the plurality of peers connected to an audio source configured to transmit and receive audio to and from each of the plurality of peers, the core peer configured to transmit and receive audio directly to and from the audio source, the plurality of node peers configured to transmit and receive audio to and from the audio source through the core peer, wherein some node peers are closer to the core node than other node peers in the peer to peer connection;
   monitoring the plurality of node peers when the audio source transmits audio to identify one or more node peers that frequently transmit audio to the audio source and to identify one or more node peers that do not transmit audio to the audio source;
   clustering the one or more node peers that frequently transmit audio to the audio source to form active node peers;
   clustering the one or more node peers that do not transmit audio to the audio source to form passive node peers; and
   dynamically moving the active node peers closer to the core node, and moving the passive node peers away from the core node in the peer to peer connection.

2. A method as in claim 1, wherein dynamically moving the active node peers closer to the audio source comprises decreasing end-to-end latency between the audio source and each of the active node peers.

3. A method as in claim 1, wherein each peer of the plurality of peers is authenticated when each peer connects to the peer to peer connection for the first time.

4. A method as in claim 1, wherein dynamically moving the passive node peers comprises increasing audio playback buffer to reduce audio hiccups of each of the passive node peers.

5. A method as in claim 1, wherein the plurality of peers include a recording peer to record a voice of the audio source, wherein the audio includes a plurality of voice portions within the voice, the method further comprising:
   converting the recorded voice into text, wherein portions of text match voice portions within the voice;
   storing the text in a searchable indexing server; and
   in response to receiving keywords corresponding to the portions of text that match the voice portions, providing the voice portions.

6. A method as in claim 1, wherein the plurality of peers further include a time shifted peer that receives audio from the audio source at a time different from a real time in which the audio source is transmitted, the method further comprising:
   upon determining that the audio from the audio source is transmitted to a time shifted peer, recording the audio; and
   in response to a request from the time shifted peer, transmitting the recorded audio.

7. A method as in claim 1, further comprising forming a composite packet of audio to be sent to the plurality of peers, and subtracting, at each peer, a portion of the packet which represents audio which is produced locally.

8. A method as in claim 7, further comprising adjusting the volume of the audio among the peers.

9. A method as in claim 1, further comprising:
   assigning a score to each peer in the peer to peer connection, a score of a peer indicating whether the peer is an active node peer or a passive node peer based on comparing the score to a threshold;
   changing the score of a peer based on the audio received from the peer by the audio source; and
   upon determining that the score of a passive node peer satisfies the threshold, changing the passive node peer to an active node peer.

10. An apparatus, comprising:
    a peer management system comprising a plurality of peer computers, each peer computer configured to transmit and receive audio, wherein the peer management system allows establishing a peer to peer connection between the plurality of peer computers;
    an authentication server operatively coupled to the peer management system, the authentication server to authenticate each peer computer once before each peer computer is included in the peer to peer connection, each peer computer capable of directly including to the peer to peer connection without interaction with the authentication server after being authenticated once; and
    a voice to text indexing server operatively coupled to one or more peer computers of the plurality of peer computers, the indexing server configured to perform operations comprising:
       receiving audio including a plurality of audio segments from a peer computer,
       converting the audio into text including a plurality of text segments corresponding to the plurality of audio segments,
       storing the text, and
       in response to receiving a text segment, identifying and providing an audio segment corresponding to the text segment.

11. An apparatus as in claim 10, wherein said peer management system detects more interactivity of a peer computer, and adjusts a position of the peer computer within a tree formed by the plurality of peer computers, so that peer computers which require lower latency are closer to a root of the tree.

12. An apparatus as in claim 10, further comprising at least one peer computer, having audio encoding and decoding capability.

13. An apparatus as in claim 12, wherein said peer computer forms a combined audio packet indicative of all audio from all peer computers.

14. An apparatus as in claim 13, wherein said peer computer further forms a listening packet, indicative of all audio from all peer computers, with audio from a local peer computer subtracted.

15. An apparatus as in claim 10, wherein said peer management system moves peer computers adaptively closer to a source of said audio and further from the source of said audio, based on a detected latency requirement.

\* \* \* \* \*

UNITED STATES PATENT AND TRADEMARK OFFICE
CERTIFICATE OF CORRECTION

PATENT NO. : 7,577,110 B2
APPLICATION NO. : 11/504536
DATED : August 18, 2009
INVENTOR(S) : Roger Zimmermann et al.

It is certified that error appears in the above-identified patent and that said Letters Patent is hereby corrected as shown below:

ON THE TITLE PAGE:

Item (56) (Other Publications), line 1 delete "multicase" and insert --multicast--;

Item (57) (Abstract), line 7 delete "close" and insert --closer--.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,577,110 B2  Page 1 of 1
APPLICATION NO. : 11/504536
DATED : August 18, 2009
INVENTOR(S) : Zimmermann et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 110 days.

Delete the phrase "by 110 days" and insert -- by 109 days --

Signed and Sealed this

Twenty-seventh Day of April, 2010

David J. Kappos
*Director of the United States Patent and Trademark Office*